(12) United States Patent
Fukui et al.

(10) Patent No.: US 12,729,992 B2
(45) Date of Patent: Sep. 8, 2026

(54) FLOW PASSAGE ADAPTER

(71) Applicant: Panasonic Intellectual Property Management Co., Ltd., Osaka (JP)

(72) Inventors: Hiroto Fukui, Nara (JP); Hiroshi Nakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 18/292,082

(22) PCT Filed: Oct. 5, 2022

(86) PCT No.: PCT/JP2022/037330

§ 371 (c)(1), (2) Date: Jan. 25, 2024

(87) PCT Pub. No.: WO2023/074294

PCT Pub. Date: May 4, 2023

(65) Prior Publication Data

US 2025/0085150 A1 Mar. 13, 2025

(30) Foreign Application Priority Data

Oct. 27, 2021 (JP) ................................ 2021-175118

(51) Int. Cl.
*G01F 15/18* (2006.01)

(52) U.S. Cl.
CPC ................................ *G01F 15/185* (2013.01)

(58) Field of Classification Search
None
See application file for complete search history.

(56) References Cited

U.S. PATENT DOCUMENTS

2008/0072979 A1* 3/2008 Rosenbaum ..... F02M 35/10144 138/39
2020/0149944 A1* 5/2020 Haag .................... G01F 15/125
(Continued)

FOREIGN PATENT DOCUMENTS

| | | |
|---|---|---|
| EP | 0 987 526 | 3/2000 |
| JP | 2013-186032 | 9/2013 |
| JP | 2020-134510 | 8/2020 |

OTHER PUBLICATIONS

Extended European Search Report issued Feb. 10, 2025 in corresponding European Patent Application No. 22886626.5.
(Continued)

*Primary Examiner* — Stephanie E Bloss
*Assistant Examiner* — Diana Hancock
(74) *Attorney, Agent, or Firm* — Wenderoth, Lind & Ponack, L.L.P.

(57) ABSTRACT

A flow passage adapter of the present disclosure is a flow passage adapter configured to be attached to an inflow port of a flow rate measuring unit to introduce a measurement target fluid into the flow rate measuring unit. The flow passage adapter includes a flow passage which is disposed in a body of the flow passage adapter and through which the measurement target fluid is to flow and a plurality of ribs disposed in the flow passage such that the measurement target fluid introduced into the flow passage collides with the plurality of ribs, and the flow passage adapter being configured to be attached to the flow rate measuring unit such that the flow passage adapter covers the inflow port of the flow rate measuring unit.

9 Claims, 6 Drawing Sheets

(56) References Cited

U.S. PATENT DOCUMENTS

2020/0292364 A1* 9/2020 Xiong .................... G01F 1/662
2020/0400473 A1* 12/2020 Andrii ...................... G01F 5/00

OTHER PUBLICATIONS

International Search Report issued Nov. 8, 2022 in corresponding International Application No. PCT/JP2022/037330.

* cited by examiner 30
32
33
20
34
35
31
36
10

40
42
43
20
41
45
10
46

FLOW PASSAGE ADAPTER

CROSS-REFERENCE TO RELATED APPLICATIONS

The present application is the U.S. National Phase under 35 U.S.C. § 371 of International Application No. PCT/JP2022/037330, filed on Oct. 5, 2022, which claims the benefit of priority of Japanese Patent Application No. 2021-175118, filed on Oct. 27, 2021, the entire contents of which are incorporated herein by reference.

TECHNICAL FIELD

The present disclosure relates to a flow passage adapter configured to be attached to an inflow port of a flow rate measuring unit.

BACKGROUND ART

Patent Literature 1 discloses a flow rate measuring unit having an inflow port at which a chamber is provided. In the flow rate measuring unit, the chamber has a function of rectifying a measurement target fluid, thereby improving measurement accuracy.

The present disclosure provides a flow passage adapter configured to stabilize measurement accuracy in a flow rate measuring unit.

CITATION LIST

Patent Literature

Patent Literature 1: JP 2013-186032 A

SUMMARY OF INVENTION

A flow passage adapter in the present disclosure is a flow passage adapter configured to be attached to an inflow port of a flow rate measuring unit to introduce a measurement target fluid into the flow rate measuring unit. The flow passage adapter includes a flow passage which is disposed in a body of the flow passage adapter and through which the measurement target fluid is to flow and a plurality of ribs disposed in the flow passage such that the measurement target fluid introduced into the flow passage collides with the plurality of ribs, and the flow passage adapter is configured to be attached to the flow rate measuring unit such that the flow passage adapter covers the inflow port of the flow rate measuring unit.

DESCRIPTION OF EMBODIMENTS (Expertise and the Like as a Basis for Present Disclosure)

At the time the inventors arrived at the idea of the present disclosure, measuring a flow rate of a gas by using a flow rate measuring unit built in a gas meter had the problem that directly introducing, into the flow rate measuring unit, the gas flowing into the gas meter through an inlet of the gas meter causes turbulence in a flow of the gas and makes impossible stable measurement of the flow rate. Therefore, various types of configurations have been disclosed to rectify a measurement target fluid flowing into the flow rate measuring unit.

On the other hand, passing a predetermined dust test is required on the premise that the gas, which is the measurement target fluid, includes dust, and to address this problem, a filter for removing the dust or a structural device for collecting the dust is required.

Adding components required to solve the respective two problems, however, causes an increase in cost.

Therefore, the present disclosure provides a flow passage adapter configured to implement both rectification and a measure for dust and to suppress cost from increasing.

With reference to the drawings, an embodiment will be described in detail below. Note that unnecessarily detailed description may be omitted. For example, detailed description of well-known matters, or repeated description of substantially the same components may be omitted. This is to avoid making the following description unnecessarily redundant and to facilitate the understanding of a person skilled in the art.

Note that the drawings attached herewith and the following description are provided for a person skilled in the art to satisfactorily understand the present disclosure but are not intended to limit the subject matter in the claims.

First Embodiment

Referring to FIGS. 1 to 6B, a first embodiment will be described below:

[1-1. Configuration of Flow Passage Adapter]

Figure 1:
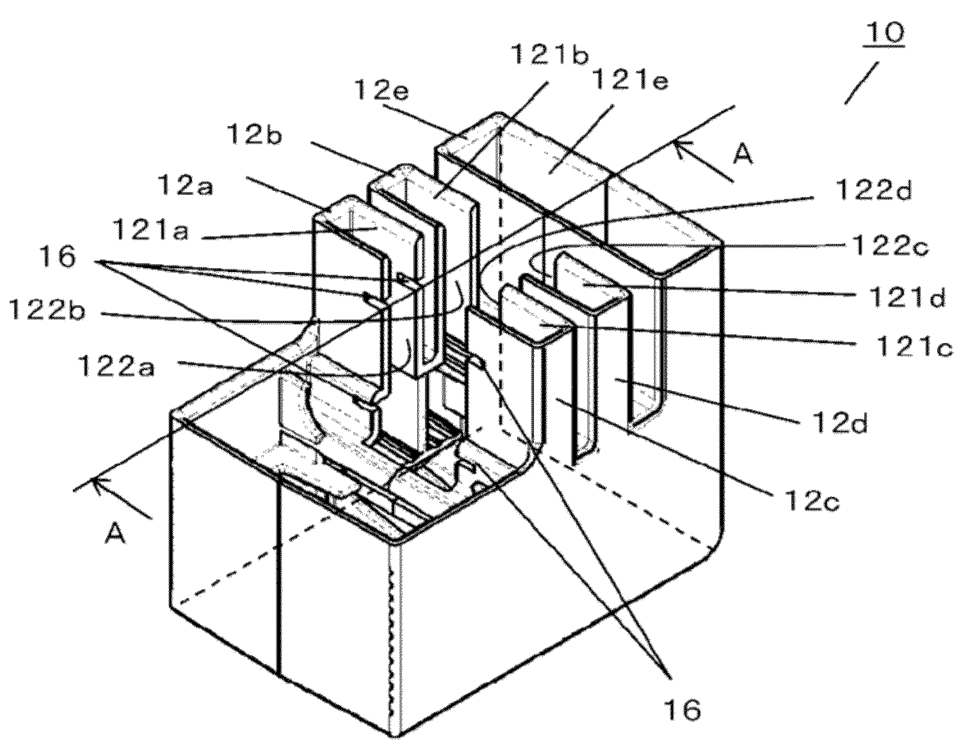
FIG. 1 is a perspective view of a flow passage adapter of a first embodiment.
Figure 2:
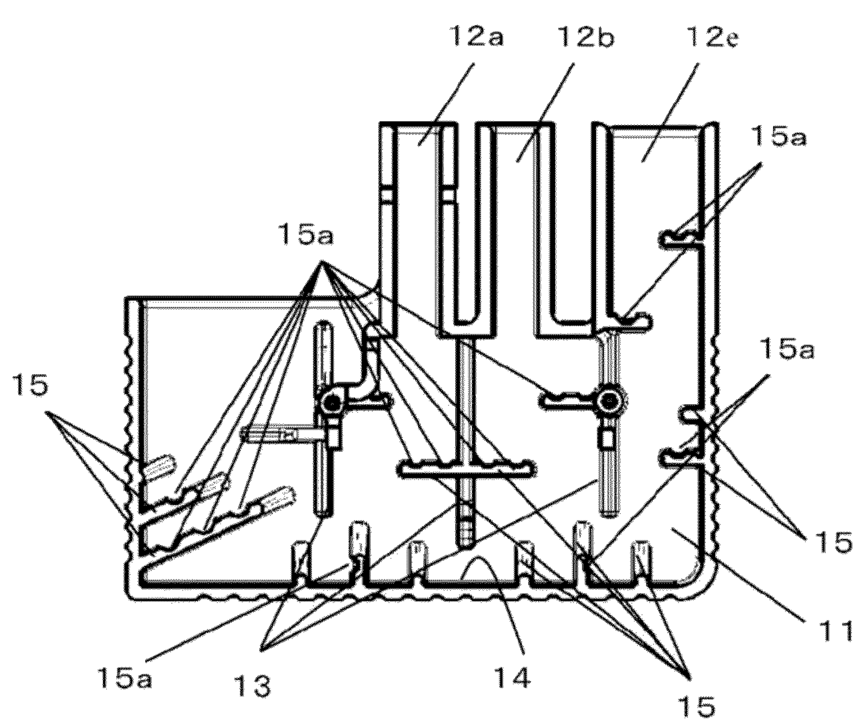
FIG. 2 is a sectional view of the flow passage adapter of the first embodiment along line A-A.
Figure 3:
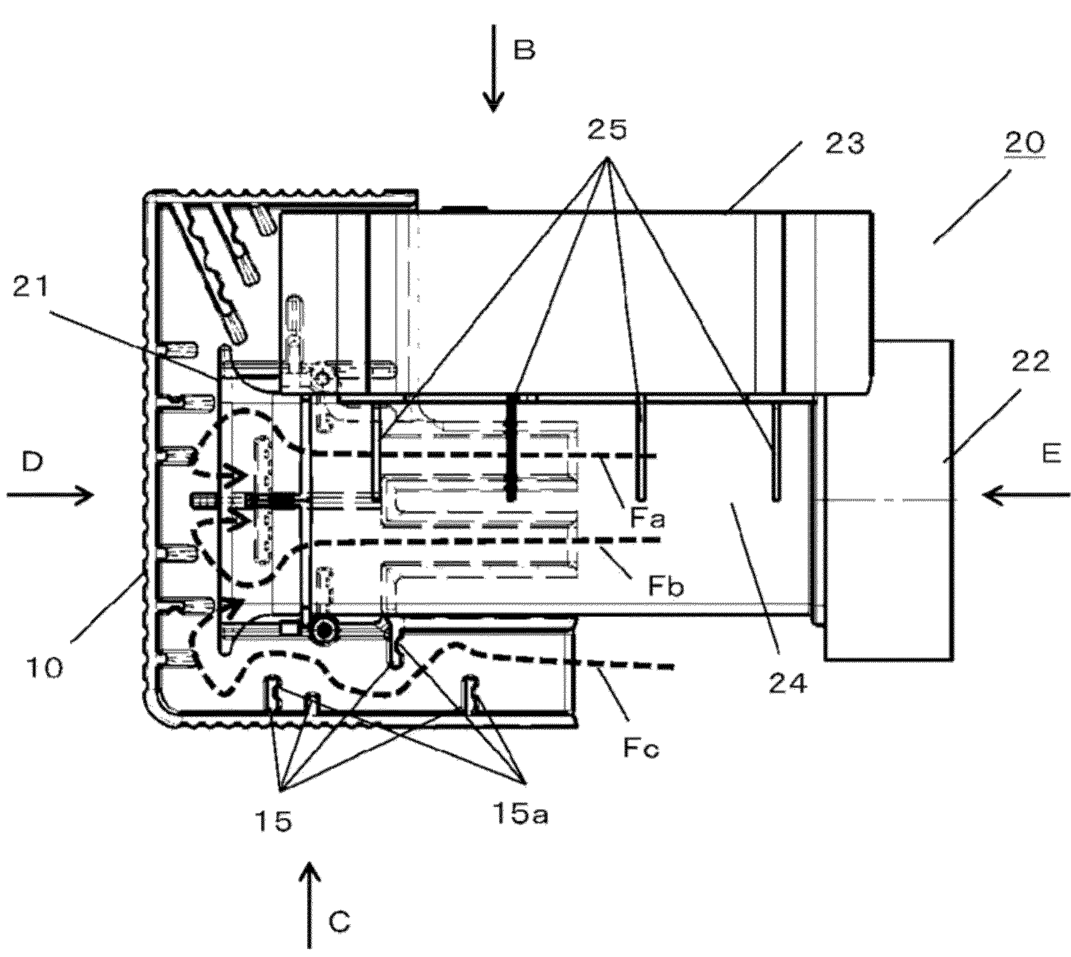
FIG. 3 is a sectional view of the flow passage adapter of the first embodiment being attached to a flow rate measuring unit.
Figure 4A:
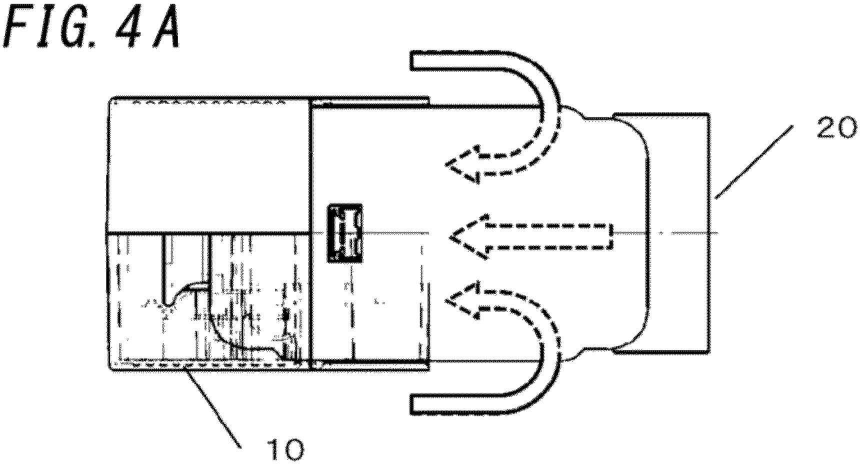
FIG. 4A is a view of the flow passage adapter of the first embodiment being attached to the flow rate measuring unit and being viewed in the direction of arrow B of FIG. 3.
Figure 4B:
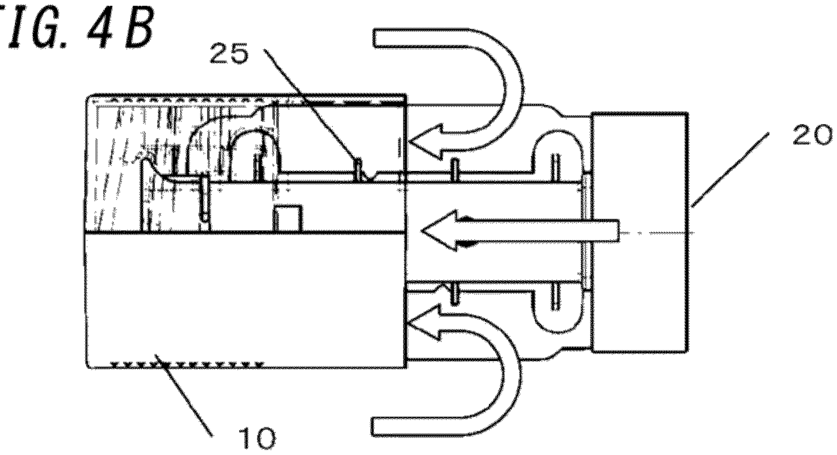
FIG. 4B is a view of the flow passage adapter of the first embodiment being attached to the flow rate measuring unit and being viewed in the direction of arrow C of FIG. 3.
Figure 4C:
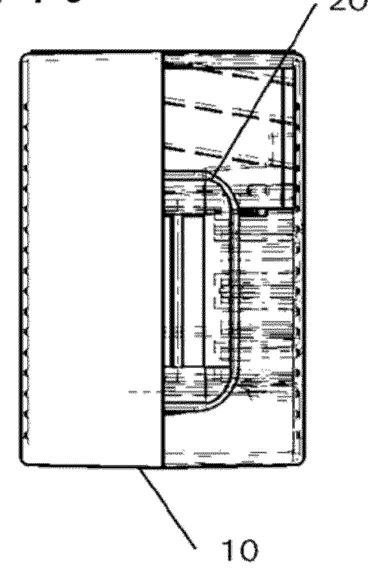
FIG. 4C is a view of the flow passage adapter of the first embodiment being attached to the flow rate measuring unit and being viewed in the direction of arrow D of FIG. 3.
Figure 4D:
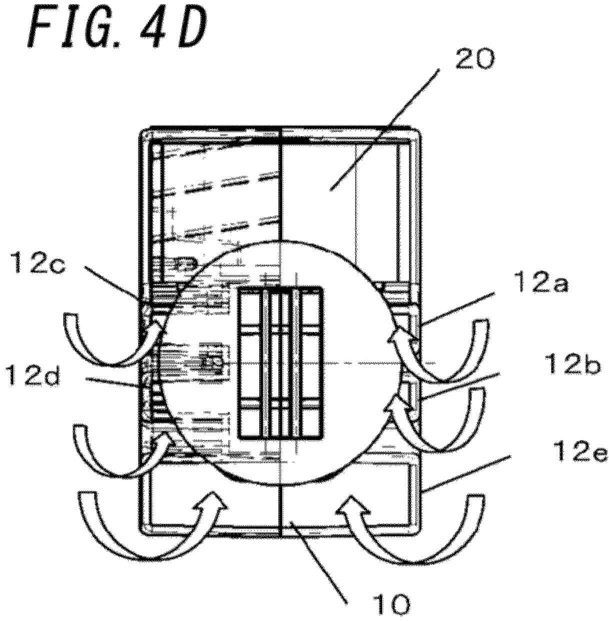
FIG. 4D is a view of the flow passage adapter of the first embodiment being attached to the flow rate measuring unit and being viewed in the direction of arrow E of FIG. 3.

FIG. 1 is a perspective view of a flow passage adapter 10 of the present embodiment. FIG. 2 is a sectional view along line A-A of FIG. 1. FIG. 3 is a sectional view along line A-A of FIG. 1 and shows the flow passage adapter 10 being attached to a flow rate measuring unit 20. The flow passage adapter 10 has a symmetric shape with respect to the sectional surface along line A-A, and in the following description, the structure of the flow passage adapter 10 will be described with reference to FIG. 2.

In FIGS. 1 to 3, the flow passage adapter 10 has a flow passage 11 for introducing a gas in a gas meter into an inflow port 21 of the flow rate measuring unit 20. The flow passage 11 includes introduction flow passages 12*a* to 12*e* as inlets of the gas, and three partition plates 13 partition an interior of the flow passage adapter 10, thereby forming the flow passage from the introduction flow passages 12*a* to 12*e* to the inflow port 21 of the flow rate measuring unit 20.

The introduction flow passage 12*e* has an opening at only an inflow port 121*e* into which the gas is to flow; whereas the introduction flow passages 12*a* to 12*d* have openings, respectively, at inflow ports 121*a* to 121*d* into which the gas is to flow; and the introduction flow passages 12*a* to 12*d* further have openings 122*a* to 122*d*, respectively, at parts of the flow passages. The openings 122*a* to 122*d* are closed when the flow passage adapter 10 is attached to the flow rate measuring unit 20 as described later, thereby forming the flow passages. Note that the inflow port 21 of the flow rate measuring unit 20 may be referred to as a first inflow port, and the inflow ports 121*a* to 121*e* of the flow passage adapter 10 may be referred to as second inflow ports.

Moreover, the flow passage 11 includes a plurality of ribs 15 having different heights disposed on an inside wall 14 forming the flow passage and wall surfaces of the partition plates 13. The ribs 15 are arranged with a space therebetween such that the ribs 15 adjacent to each other have different heights, and in addition, some of the ribs 15 which are relatively high are provided with grooves 15*a*. Moreover, the introduction flow passages 12*a* to 12*e* may be provided with ribs 15.

The flow rate measuring unit 20 to which the flow passage adapter 10 is to be attached includes: the inflow port 21 into which the gas, which is the measurement target fluid, flows: a measurement flow passage 24 in which a sensor (not shown) configured to measure a flow rate is disposed: an outflow port 22 which is an outlet of the gas; and a controller 23 configured to control the sensor and to measure the flow rate.

As shown in FIG. 3, the flow passage adapter 10 is attached to the flow rate measuring unit 20 such that the flow passage adapter 10 covers the inflow port 21 of the flow rate measuring unit 20. Thus, the openings 122*a* to 122*d* respectively of the introduction flow passages 12*a* to 12*d* are closed with an outer wall forming the measurement flow passage 24 of the flow rate measuring unit 20, thereby forming the flow passages. Thus, the gas flows along pathways indicated by dotted lines Fa, Fb, and Fc, from the inflow ports (second inflow ports) 121*a* to 121*e* respectively of the introduction flow passages 12*a* to 12*e* into the flow passage 11 in the flow passage adapter 10 and is then guided to the inflow port (first inflow port) 21 of the flow rate measuring unit 20.

FIGS. 4A to 4D are respectively a view in the direction of arrow B, a view in the direction of arrow C, a view in the direction of arrow D, and a view in the direction of arrow E of FIG. 3 and show the flow of the gas by hollow arrows. Note that in FIGS. 4A to 4D, inner structures, such as the ribs 15, of a part (one-half) of the flow passage adapter 10 are shown by dotted lines. As shown in FIGS. 4A to 4D, the gas flows from an environment of the flow rate measuring unit 20 into each introduction flow passage.

Figure 5A:
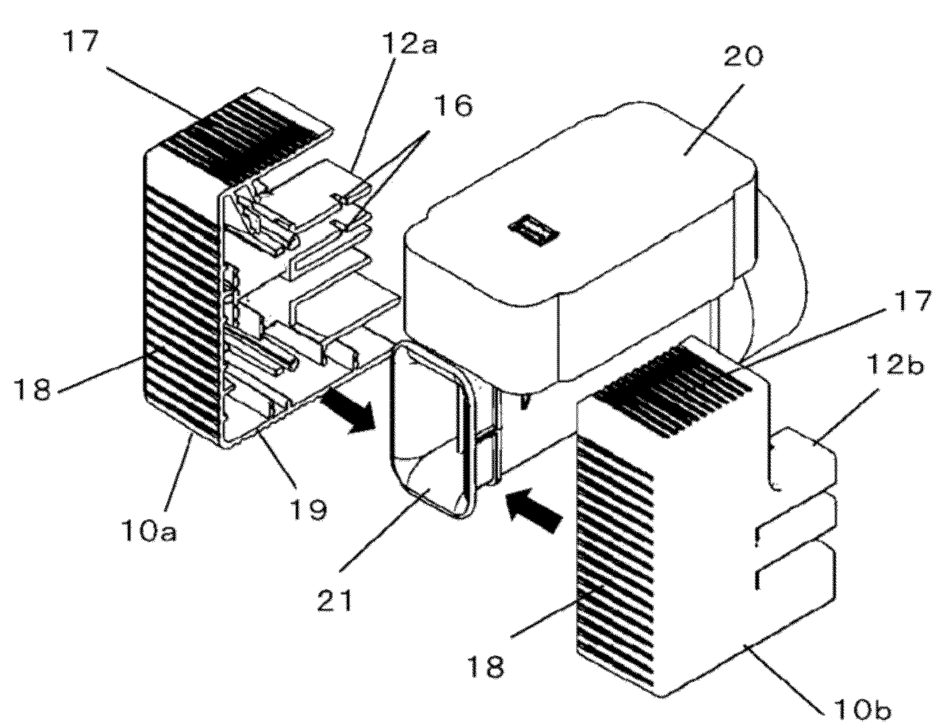
FIG. 5A is a perspective view of the flow passage adapter of the first embodiment before attached to the flow rate measuring unit.
Figure 5B:
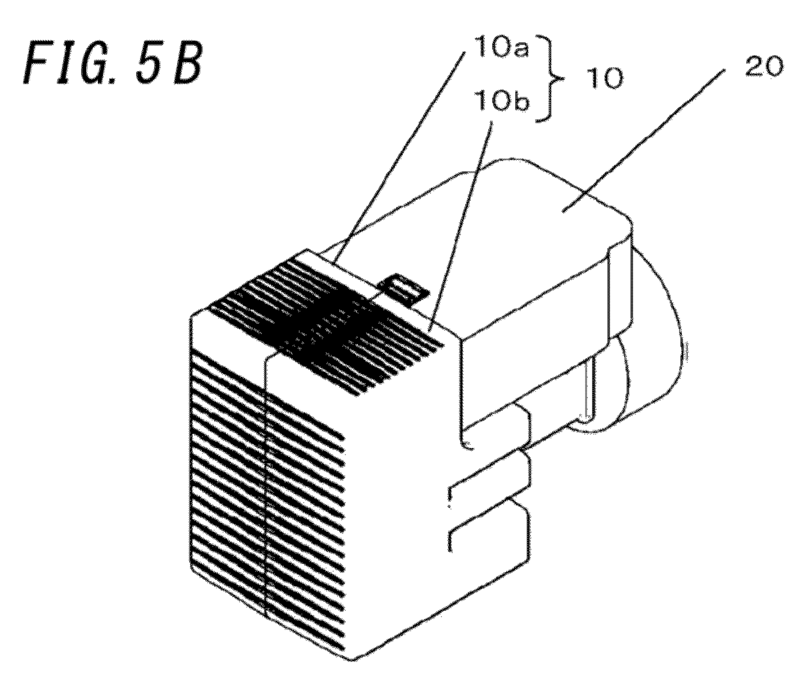
FIG. 5B is a perspective view of the flow passage adapter of the first embodiment being attached to the flow rate measuring unit.

FIGS. 5A and 5B show a method for attaching the flow passage adapter 10 to the flow rate measuring unit 20, wherein a body of the flow passage adapter 10 includes a first body 10*a* and a second body 10*b* which are obtained by dividing the body into two parts in the center of the body. The first body 10*a* and the second body 10*b* are made of a resin. The first body 10*a* and the second body 10*b* are substantially symmetrical, are attached to the flow rate measuring unit 20 from left and right sides of the inflow port 21 of the flow rate measuring unit 20, and are joined to each other to form a single piece functioning as the flow passage adapter 10. Note that as a method for joining the first body 10*a* and the second body 10*b* to each other, for example, mechanical fixation such as screwing and snap fitting, or adhesion may accordingly be employed.

Moreover, it is needless to say that the partition plates 13 and the ribs 15 disposed in the flow passage adapter 10 are formed not to interfere the flow rate measuring unit 20, and a gap enough to hold the flow passage adapter 10 is provided, and in addition, cutouts 16 formed in the introduction flow passages 12*a* and 12*b* are fit to ribs 25 of the flow rate measuring unit 20, thereby achieving positioning and fixation.

Further, although omitted in FIGS. 1 to 4D, surfaces of the flow passage adapter 10 have a plurality of uneven portions 17, 18, and 19 each formed by grooves extending through the entire width of a corresponding one of the surfaces.

Moreover, the partition plates 13, the ribs 15, and the introduction flow passages 12*a* to 12*e* formed in each of the first body 10*a* and the second body 10*b*, and the uneven portions 17 to 19 are configured to be released from a mold in one direction when formed by molding a resin. Note that the introduction flow passages 12*a* to 12*e* have partially open side walls, but when the flow passage adapter 10 is attached to the flow rate measuring unit 20, opening portions (openings 122*a* to 122*d*) of the introduction flow passages 12*a* to 12*e* are closed with the outer wall of the measurement flow passage 24 of the flow rate measuring unit 20, and therefore, the introduction flow passages 12*a* to 12*e* function as independent flow passages without problems.

Figure 6A:
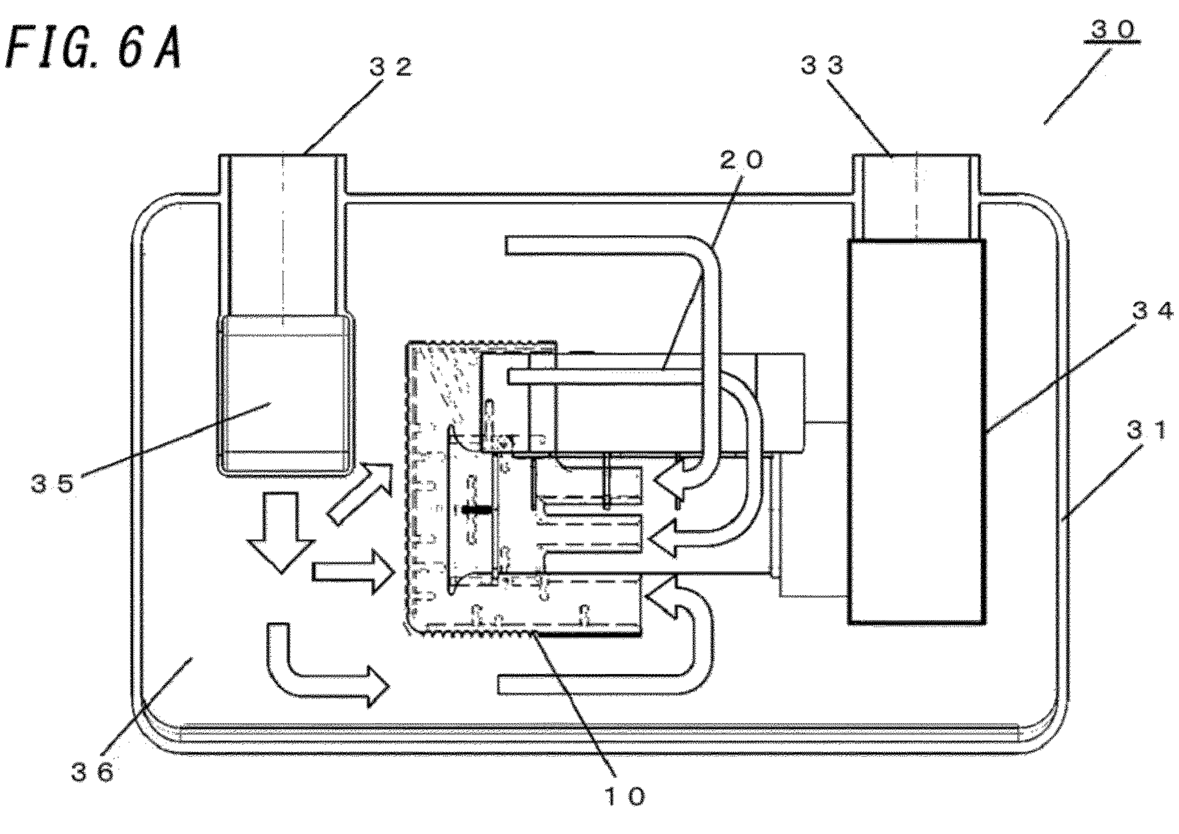
FIG. 6A is a sectional view of the flow rate measuring unit with the flow passage adapter of the first embodiment attached thereto being mounted on a gas meter.
Figure 6B:
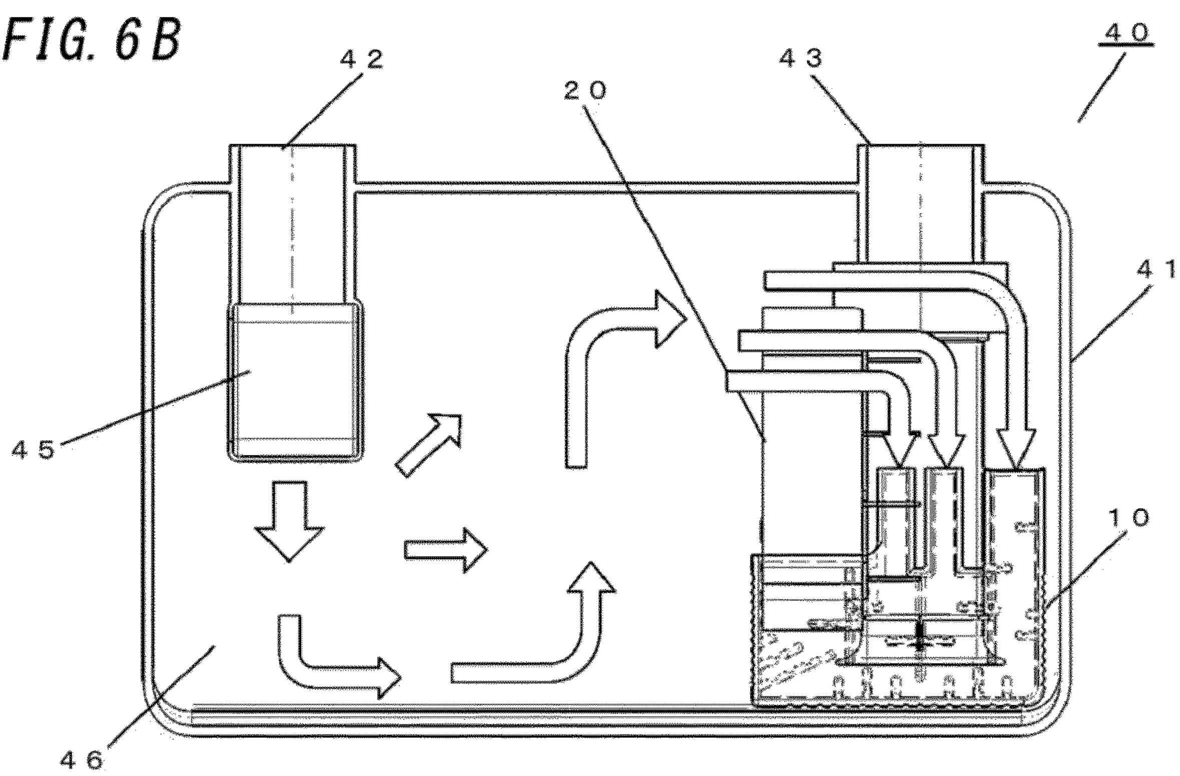
FIG. 6B is a sectional view of the flow rate measuring unit with the flow passage adapter of the first embodiment attached thereto being mounted on another gas meter.

FIGS. 6A to 6B are each a sectional view of the flow rate measuring unit 20 with the flow passage adapter 10 of the present embodiment attached thereto being mounted on a gas meter. FIG. 6A is a sectional view of a gas meter 30 on which the flow rate measuring unit 20 has been mounted, and FIG. 6B is a sectional view of a gas meter 40 on which the flow rate measuring unit 20 has been mounted.

In FIG. 6A, the gas meter 30 includes a housing 31 having an internal space 36 having an inlet 32 for the gas and an outlet 33 for the gas. To the inlet 32, a shut-off valve 35 configured to shut off the gas in case of abnormality is connected. To the outlet 33, an internal pipe 34 is connected. The flow rate measuring unit 20 is disposed in the horizontal direction with respect to the housing 31 of the gas meter 30, and the outflow port 22 of the flow rate measuring unit 20 is connected and fixed to the internal pipe 34.

Then, the gas flowing into the inlet 32 passes through the shut-off valve 35, reaches the internal space 36, diffuses as shown by the hollow arrow; and then, flows around from a side on which the internal pipe 34 is disposed to the introduction flow passages 12*a* to 12*e* of the flow passage adapter 10.

In FIG. 6B, the gas meter 40 includes an inlet 42 for the gas and an outlet 43 for the gas provided at the housing 41 having the internal space 46, and to the inlet 42, a shut-off valve 45 for shutting off the gas in case of abnormality is connected. The flow rate measuring unit 20 is disposed in a vertical direction with respect to the gas meter 40, and the outflow port 22 of the flow rate measuring unit 20 is connected and fixed to the outlet 43.

Then the gas flowing into the inlet 42 passes through the shut-off valve 45, reaches the internal space 46, diffuses as shown by the hollow arrow, and then, flows around from an upper part in the internal space 46 to the introduction flow passages 12*a* to 12*e* of the flow passage adapter 10.

[1-2. Operation of Flow Passage Adapter]

Operation of the flow passage adapter 10 having the configuration described above will be described below.

As shown in FIG. 3, the gas flowing into the flow passage adapter 10 collides with the ribs 15 disposed in the flow passage 11 and/or the introduction flow passages 12*a* to 12*e*, thereby flowing to the inflow port 21 of the flow rate measuring unit 20 while meandering as indicated by dotted lines Fa, Fb, and Fc.

The operation at that time will be described in detail below with reference to the flow indicated by the dotted line Fc as an example. When the gas includes dust, a collision of the gas with the ribs 15 causes the gas to flow while the dust is collected by the ribs, and therefore, the plurality of ribs provided in the passage to the inflow port 21 of the flow rate measuring unit 20 gradually remove the dust in the gas.

In the present embodiment, some of the ribs 15 having a certain height have the grooves 15*a*, and therefore, the grooves 15*a* can efficiently collect the dust in the gas.

Moreover, the gas flows while meandering, thereby producing a rectification effect and homogenizing the flow of the gas flowing into the flow rate measuring unit 20, so that stable measurement can be performed. Thus, when the flow rate measuring unit 20 with the flow passage adapter 10 attached thereto is mounted on the gas meter, the stable measurement can be performed regardless of the direction of the flow rate measuring unit 20 as shown in FIGS. 6A and 6B.

[1-3. Effects, Etc. Of Flow Passage Adapter]

As described above, the following aspects are disclosed from the present embodiment and the like.

A flow passage adapter (10) of a first aspect is a flow passage adapter (10) configured to be attached to an inflow port (21) of a flow rate measuring unit (20) to introduce a measurement target fluid into the flow rate measuring unit (20). The flow passage adapter (10) includes a flow passage (11) which is disposed in a body of the flow passage adapter and through which the measurement target fluid is to flow and a plurality of ribs (15) disposed in the flow passage (11) such that the measurement target fluid introduced into the flow passage (11) collides with the plurality of ribs (15), the flow passage adapter (10) being configured to be attached to the flow rate measuring unit (20) such that the flow passage adapter (10) covers the inflow port (21) of the flow rate measuring unit (20).

This enables dust included in the measurement target fluid to be collected, and further, a rectification effect enables the flow rate measuring unit (20) to stably measure the flow rate.

In a flow passage adapter (10) of a second aspect referring to the first aspect, at least some ribs (15) of the plurality of ribs (15) have grooves (15*a*) in surfaces with which the measurement target fluid collides.

This improves performance of collecting dust included in the measurement target fluid.

In a flow passage adapter (10) of a third aspect referring to the first or the second aspect, the inflow port (21) of the flow rate measuring unit (20) is a first inflow port, the flow passage (11) includes an introduction flow passage (12*a* to 12*e*) for the measurement target fluid, and the introduction flow passage (12*a* to 12*e*) has a second inflow port (inflow ports 121*a* to 121*e*) extending in a direction opposite to a flowing direction to the flow rate measuring unit (20).

This increases the flow passage in the flow passage adapter (10), improves the performance of collecting dust included in the measurement target fluid, and improves the rectification effect, and therefore, when the flow rate measuring unit (20) is attached to the gas meter, the flow rate can be stably measured without depending on an attachment direction. Moreover, providing a rib (15) to the introduction flow passage (12*a* to 12*e*) further improves the performance of collecting dust.

In a flow passage adapter (10) of a fourth aspect referring to the third aspect, the introduction flow passage (12*a* to 12*e*) may be arranged along a periphery of a measurement flow passage (24) of the flow rate measuring unit (20).

This enables the flow passage adapter (10) to be downsized, thereby downsizing also the gas meter to which the flow rate measuring unit (20) with the flow passage adapter (10) attached thereto is attached.

In a flow passage adapter (10) of a fifth aspect referring to the fourth aspect, in a state where the flow passage adapter (10) is attached to the flow rate measuring unit (20), the introduction flow passage (12*a* to 12*e*) may partially be formed by an outer wall (outer peripheral surface) of the measurement flow passage of the flow rate measuring unit (20).

Thus, when a first body (10*a*) and a second body (10*b*) which are included in the flow passage adapter (10) are molded from a resin, the introduction flow passage (12*a* to 12*e*) may be molded to have a partially open part (surface facing the flow passage adapter (10)), and also in this case, the open surface is closed with the outer wall (outer peripheral surface) of the measurement flow passage when the flow passage adapter (10) is attached to the flow rate measuring unit (20), and therefore, the introduction flow passage (12*a* to 12*e*) can function as a flow passage.

Moreover, in a flow passage adapter (10) of a sixth aspect referring to any one of the third to fifth aspects, the introduction flow passage (12*a* to 12*e*) may include a plurality of introduction flow passages.

This enables an area with which the measurement target fluid comes into contact until the measurement target fluid reaches the inflow port (21) of the flow rate measuring unit (20) to be increased, thereby improving the performance of collecting dust.

Moreover, in a flow passage adapter (10) of a seventh aspect referring to any one of the first to sixth aspects, the body of the flow passage adapter (10) includes a first body (10*a*) and a second body (10*b*) which are obtained by dividing the body into two parts, and the first body (10*a*) and the second body (10*b*) may be joined to each other to attach the body to the flow rate measuring unit (20) such that the body covers the inflow port (21) of the flow rate measuring unit (20).

This enables the first body (10*a*) and the second body (10*b*) to be easily molded from a resin and to be easily attached to the flow rate measuring unit (20).

Note that the embodiment described above is to exemplify a technology in the present disclosure, and therefore, various changes, replacements, additions, omissions, etc. that fall within the scope of the claims or the range of equivalency of the claims may be made to embodiment described above.

INDUSTRIAL APPLICABILITY

The present disclosure is applicable to a flow rate measuring unit used in a gas meter configured to measure the flow rate of the measurement target fluid which is a gas including dust.

REFERENCE SIGNS LIST

10 Flow Passage Adapter
11 Flow Passage
12*a*, 12*b*, 12*e* Introduction Flow Passage
13 Partition Plate
14 Inside Wall
15 Rib
16 Cutout
17, 18, 19 Uneven Portion
20 Flow Rate Measuring Unit
21 Inflow Port
22 Outflow Port
23 Controller
24 Measurement Flow Passage
25 Rib
30, 40 Gas Meter

The invention claimed is:

1. A flow passage adapter configured to be attached to an inflow port of a flow rate measuring unit to introduce a measurement target fluid into the flow rate measuring unit, the flow passage adapter comprising:
- a flow passage which is disposed in a body of the flow passage adapter and through which the measurement target fluid is to flow; and
- a plurality of ribs disposed in the flow passage such that the measurement target fluid introduced into the flow passage collides with the plurality of ribs,
- the flow passage adapter being configured to be attached to the flow rate measuring unit such that the flow passage adapter covers the inflow port of the flow rate measuring unit,
- the inflow port of the flow rate measuring unit being a first inflow port,
- the flow passage includes an introduction flow passage for the measurement target fluid,
- the introduction flow passage having a second inflow port extending in a direction opposite to a flowing direction to the flow rate measuring unit,
- the introduction flow passage having a first opening at the second inflow port into which the measurement target fluid is to flow,
- the first opening opening toward a first direction,
- the introduction flow passage further having a second opening which opens toward a second direction different from the first direction, and
- in a state in which the flow passage adapter is attached to the flow rate measuring unit, the second opening of the introduction flow passage is closed with an outer wall forming a measurement flow passage of the flow rate measuring unit so as to form the introduction flow passage.

2. The flow passage adapter of claim 1, wherein
at least some ribs of the plurality of ribs have grooves in surfaces with which the measurement target fluid collides.

3. The flow passage adapter of claim 2, wherein
the body of the flow passage adapter includes a first body and a second body which are obtained by dividing the body into two parts, and
the first body and the second body are joined to each other to attach the body to the flow rate measuring unit such that the flow passage adapter covers the inflow port of the flow rate measuring unit.

4. The flow passage adapter of claim 1, wherein the introduction flow passage is arranged along a periphery of the measurement flow passage of the flow rate measuring unit.

5. The flow passage adapter of claim 4, wherein
the introduction flow passage includes a plurality of introduction flow passages.

6. The flow passage adapter of claim 4, wherein
the body of the flow passage adapter includes a first body and a second body which are obtained by dividing the body into two parts, and
the first body and the second body are joined to each other to attach the body to the flow rate measuring unit such that the flow passage adapter covers the inflow port of the flow rate measuring unit.

7. The flow passage adapter of claim 1, wherein
the introduction flow passage includes a plurality of introduction flow passages.

8. The flow passage adapter of claim 7, wherein
the body of the flow passage adapter includes a first body and a second body which are obtained by dividing the body into two parts, and
the first body and the second body are joined to each other to attach the body to the flow rate measuring unit such that the flow passage adapter covers the inflow port of the flow rate measuring unit.

9. The flow passage adapter of claim 1, wherein
the body of the flow passage adapter includes a first body and a second body which are obtained by dividing the body into two parts, and
the first body and the second body are joined to each other to attach the body to the flow rate measuring unit such that the flow passage adapter covers the inflow port of the flow rate measuring unit.

* * * * *